(12) United States Patent
Shin et al.

(10) Patent No.: US 10,604,410 B2
(45) Date of Patent: Mar. 31, 2020

(54) NEGATIVE ELECTRODE ACTIVE MATERIAL FOR LITHIUM SECONDARY BATTERY AND METHOD OF PREPARING THE SAME

(71) Applicant: LG Chem, Ltd., Seoul (KR)

(72) Inventors: Sun Young Shin, Daejeon (KR); Su Min Lee, Daejeon (KR); Oh Byong Chae, Daejeon (KR); Eun Kyung Kim, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 15/748,747

(22) PCT Filed: Jan. 13, 2017

(86) PCT No.: PCT/KR2017/000436
§ 371 (c)(1),
(2) Date: Jan. 30, 2018

(87) PCT Pub. No.: WO2017/123029
PCT Pub. Date: Jul. 20, 2017

(65) Prior Publication Data
US 2019/0010057 A1    Jan. 10, 2019

(30) Foreign Application Priority Data

Jan. 14, 2016   (KR) .................. 10-2016-0004798
Jan. 12, 2017   (KR) .................. 10-2017-0005388

(51) Int. Cl.
*C01B 32/182*       (2017.01)
*H01M 4/587*        (2010.01)
(Continued)

(52) U.S. Cl.
CPC ............ *C01B 32/182* (2017.08); *C01B 32/21* (2017.08); *C01D 7/00* (2013.01); *C01D 15/08* (2013.01);
(Continued)

(58) Field of Classification Search
CPC ........ H01M 4/62; H01M 4/485; H01M 10/10; H01M 10/0525
(Continued)

(56) References Cited

U.S. PATENT DOCUMENTS

2009/0290287 A1    11/2009  Lipka et al.
2014/0065486 A1    3/2014   Ono et al.
(Continued)

FOREIGN PATENT DOCUMENTS

JP       2014132555 A     7/2014
JP       2015179595 A     10/2015
(Continued)

OTHER PUBLICATIONS

Search report from International Application No. PCT/KR2017/000436, dated Apr. 17, 2017.
(Continued)

*Primary Examiner* — Khanh T Nguyen
(74) *Attorney, Agent, or Firm* — Lerner, David, Littenberg, Krumholz & Mentlik, LLP (57) ABSTRACT

The present invention relates to a negative electrode active material for a lithium secondary battery, which comprises graphite having an alkali carbonate layer formed on a surface thereof, wherein the graphite has an $I_D/I_G$ ratio of 0.05 to 0.3 in Raman spectroscopy, and a method of preparing the same, wherein, since the negative electrode active material for a lithium secondary battery of the present invention includes the graphite having an alkali carbonate layer formed on the surface thereof, the alkali carbonate
(Continued)

layer contributes to the formation of a stable solid electrolyte interface (SEI) to reduce a side reaction with an electrolyte solution including propylene carbonate. Thus, since low-temperature performance and initial efficiency of the lithium secondary battery may be improved, the negative electrode active material for a lithium secondary battery of the present invention is suitable for the preparation of the lithium secondary battery.

13 Claims, 4 Drawing Sheets

(51) Int. Cl.
    *C01D 15/08*     (2006.01)
    *C01D 7/00*     (2006.01)
    *H01M 10/0525*     (2010.01)
    *C01B 32/21*     (2017.01)
    *H01M 4/36*     (2006.01)
    *H01M 4/02*     (2006.01)

(52) U.S. Cl.
    CPC ........... *H01M 4/366* (2013.01); *H01M 4/587* (2013.01); *H01M 10/0525* (2013.01); *H01M 2004/027* (2013.01)

(58) Field of Classification Search
    USPC ..................................... 252/182.1; 429/231.1
    See application file for complete search history.

(56) References Cited

U.S. PATENT DOCUMENTS

2015/0270551 A1     9/2015   Nishi et al.
2016/0322636 A1   11/2016   Lee et al.
2016/0351947 A1* 12/2016   Kamo .................. H01M 4/131

FOREIGN PATENT DOCUMENTS

KR     20030075800 A     9/2003
KR     20150143334 A   12/2015
WO   WO 2015-118846    *   8/2015   ........ H01M 10/0525

OTHER PUBLICATIONS

Komaba, S., et al., "Alkali carbonate-coated graphite electrode for lithium-ion batteries." CARBON, vol. 46, pp. 1184-1193, received Jan. 28, 2008; accepted Apr. 10, 2008; available online Apr. 22, 2008.

S.S. Zhang et al., "Effect of Li2CO3-coating on the performance of natural graphite in Li-ion battery", Electrochemistry Communications, Oct. 2003, vol. 5, p. 979-982.

\* cited by examiner

5kV
MAGNIFICATION
1,000

15kV
MAGNIFICATION
10,000

FIG. 4

NEGATIVE ELECTRODE ACTIVE MATERIAL FOR LITHIUM SECONDARY BATTERY AND METHOD OF PREPARING THE SAME

CROSS-REFERENCE TO RELATED APPLICATIONS

The present application is a national phase entry under 35 U.S.C. § 371 of International Application No. PCT/KR2017/000436 filed Jan. 13, 2017, which claims priority to Korean Patent Application No. 10-2016-0004798, filed on Jan. 14, 2016, and Korean Patent Application No. 10-2017-0005388, filed on Jan. 12, 2017, the disclosures of which are incorporated herein by reference.

TECHNICAL FIELD

The present invention relates to a negative electrode active material for a lithium secondary battery and a method of preparing the same, and more particularly, to a negative electrode active material for a lithium secondary battery, which includes graphite having an alkali carbonate layer formed on the surface thereof, and a method of preparing the same.

BACKGROUND ART

Demand for secondary batteries as an energy source has been significantly increased as technology development and demand with respect to mobile devices have increased, and, among these secondary batteries, lithium secondary batteries having high energy density, high operating potential, long cycle life, and low self-discharging rate have been commercialized and widely used.

A lithium secondary battery is a secondary battery which is generally composed of a positive electrode including a positive electrode active material, a negative electrode including a negative electrode active material, a separator, and an electrolyte and is charged and discharged by intercalation-decalation of lithium ions. Since the lithium secondary battery is advantageous in that it has large electromotive force as well as high energy density and may exhibit high capacity, the lithium secondary battery has been applied to various fields.

A metal oxide, such as $LiCoO_2$, $LiMnO_2$, $LiMn_2O_4$, or $LiCrO_2$, is being used as the positive electrode active material constituting the positive electrode of the lithium secondary battery, and metallic lithium, a carbon-based material, such as graphite or activated carbon, or a material, such as silicon oxide (SiOx), is being used as the negative electrode active material constituting the negative electrode. Among these negative electrode active materials, the metallic lithium has initially been mainly used, but, recently, the carbon-based material has been mainly used, because a phenomenon occurs in which the battery is destroyed by damaging a separator caused by the growth of lithium atoms on the surface of the metallic lithium as charge and discharge cycles proceed.

In currently commercially available lithium secondary batteries, a graphite-based active material having high capacity and long life characteristics has been mainly used in the negative electrode. However, the graphite-based active material has a limitation in that, when propylene carbonate (PC) is mixed and used with an electrolyte solution for the purpose of improving low-temperature performance, the propylene carbonate destroys the graphite-based active material by exfoliating layers of graphite of the graphite-based active material.

Thus, in order to address the limitation that the propylene carbonate destroys the graphite-based active material by exfoliating the layers of the graphite of the graphite-based active material as described above, the propylene carbonate is not used with the graphite-based active material, particularly, artificial graphite in which an amount of a functional group or surface defects is small, or a method of performing a high-temperature activation process has been used if there is a need to use the propylene carbonate inevitably.

However, in a case in which binary/ternary electrolytes based on ethylene carbonate (EC) are used as the electrolyte solution without the addition of the propylene carbonate, an operating temperature may be limited due to high melting point of the ethylene carbonate, battery performance may be significantly degraded at low temperature, and the time and cost required for the preparation of the secondary battery may be increased when performing the high-temperature activation process.

Thus, there is a need to develop a new technique which may reduce a side reaction between the propylene carbonate and the graphite-based active material.

DISCLOSURE OF THE INVENTION

Technical Problem

An aspect of the present invention provides a negative electrode active material for a lithium secondary battery which may address a limitation caused by a side reaction between a graphite-based active material and propylene carbonate.

Another aspect of the present invention provides the negative electrode active material for a lithium secondary battery and a method of preparing the same.

Technical Solution

According to an aspect of the present invention, there is provided a negative electrode active material for a lithium secondary battery which comprises graphite having an alkali carbonate layer formed on a surface thereof, wherein the graphite has an $I_D/I_G$ ratio of 0.05 to 0.3 in Raman spectroscopy.

According to another aspect of the present invention, there is provided a method of preparing a negative electrode active material for a lithium secondary battery the method comprising:

(1) preparing graphite having an $I_D/I_G$ ratio of 0.05 to 0.3 in Raman spectroscopy;

(2) mixing and stirring the graphite and an aqueous solution of alkali carbonate;

(3) filtering out the stirred mixture under reduced pressure; and (4) drying a product obtained by the filtration in a vacuum oven at a temperature of 60° C. to 200° C.

Advantageous Effects

Since a negative electrode active material for a lithium secondary battery of the present invention comprises graphite having an alkali carbonate layer formed on the surface thereof, the alkali carbonate layer contributes to the formation of a stable solid electrolyte interface (SEI) to reduce a side reaction with an electrolyte solution including propylene carbonate. Thus, since low-temperature performance and initial efficiency of the lithium secondary battery may be improved, the negative electrode active material for a lithium secondary battery of the present invention is suitable for the preparation of the lithium secondary battery.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

A negative electrode active material for a lithium secondary battery of the present invention comprises graphite having an alkali carbonate layer formed on a surface thereof.

The alkali carbonate may be at least one selected from the group consisting of sodium carbonate ($Na_2CO_3$), lithium carbonate ($Li_2CO_3$), and potassium carbonate ($K_2CO_3$).

While being formed on the surface of the graphite, the alkali carbonate layer may form a more stable and robust solid electrolyte interface (SEI) on the negative electrode active material including the graphite, on which the alkali carbonate layer is formed, through a reaction with an electrolyte solution. Since the solid electrolyte interface (SEI) may suppress a side reaction between the graphite and propylene carbonate which may be included in the electrolyte solution, initial efficiency of a lithium secondary battery including the solid electrolyte interface may be improved and high-temperature durability may be improved by reducing lithium ion self-discharge. Also, as described above, since the solid electrolyte interface may suppress the side reaction between the graphite and the propylene carbonate included in the electrolyte solution, the lithium secondary battery, which includes the negative electrode active material including the graphite on which the alkali carbonate layer is formed, may use propylene carbonate in the electrolyte solution without limitation, and thus, improved low-temperature performance may be achieved.

The alkali carbonate layer may have a thickness of 1 nm to 150 nm, particularly 10 nm to 130 nm, and more particularly 30 nm to 100 nm.

In a case in which the thickness of the alkali carbonate layer is 1 nm or more, a moderate effect of suppressing the side reaction between the graphite and the propylene carbonate due to the formation of the alkali carbonate layer may be expected, and, in a case in which the thickness of the alkali carbonate layer is 150 nm or less, an excessive reduction in electrical conductivity between graphite particles by the alkali carbonate layer may be prevented.

An amount of the alkali carbonate layer in this case may be in a range of 1 wt % to 5 wt %, for example, 2 wt % to 3 wt %, based on a total weight of the graphite having the alkali carbonate layer formed on the surface thereof.

In a case in which the amount of the alkali carbonate layer is 1 wt % or more based on the total weight of the graphite having the alkali carbonate layer formed on the surface thereof, since the alkali carbonate layer is appropriately formed on the graphite, the moderate effect of suppressing the side reaction between the graphite and the propylene carbonate due to the formation of the alkali carbonate layer may be expected, and, in a case in which the amount of the alkali carbonate layer is 5 wt % or less, an excessive increase in the thickness of the alkali carbonate layer, or excessive formation of the alkali carbonate layer, to such a degree that the alkali carbonate layer interferes with electrical conductivity between the graphite particles, that is, electric conduction between one graphite particle and other graphite particles around it, may be prevented.

The graphite may have a particle shape, and the alkali carbonate layer may cover the surface of the graphite particle. In this case, the alkali carbonate layer may be formed on an area corresponding to 10% to 50%, particularly 10% to 40%, and more particularly 20% to 30% of a total surface area of the graphite.

In a case in which the alkali carbonate layer is formed on 10% or more of the total surface area of the graphite, since the alkali carbonate layer covers an appropriate area of the surface of the graphite, the moderate effect of suppressing the side reaction between the graphite and the propylene carbonate may be expected, and, in a case in which the alkali carbonate layer is formed on 50% or less of the total surface area of the graphite, the interference of the alkali carbonate layer with the electrical conduction between the graphite particles may be prevented.

The graphite may have a particle diameter of 6 μm to 30 μm, particularly 8 μm to 25 μm, and more particularly 10 μm to 23 μm.

The graphite has an $I_D/I_G$ ratio of 0.05 to 0.3 in Raman spectroscopy.

That is, the negative electrode active material for a lithium secondary battery of the present invention includes graphite having an alkali carbonate layer formed on the surface thereof, wherein the graphite has an $I_D/I_G$ ratio of 0.05 to 0.3 in Raman spectroscopy.

Figure 1:
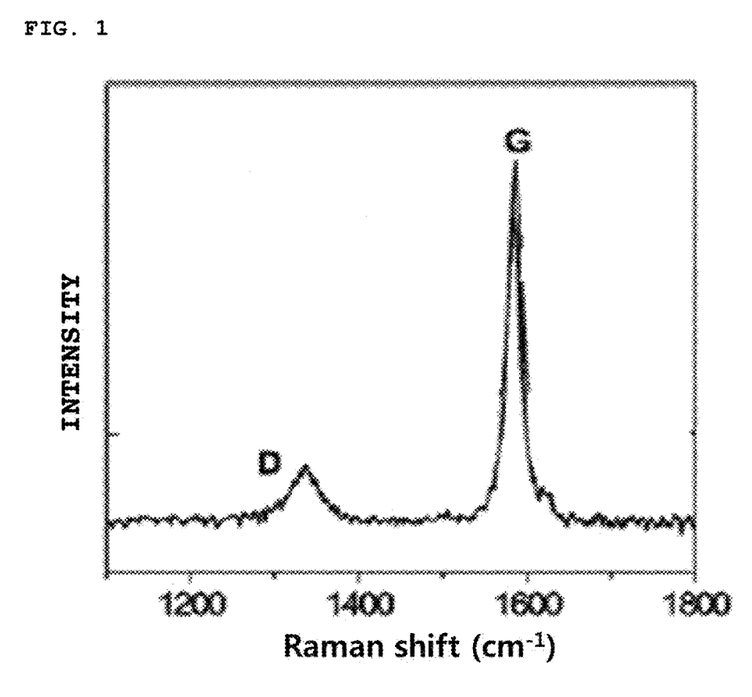
FIG. 1 illustrates an example of a Raman spectrum of graphite.

FIG. 1 illustrates an example of a Raman spectrum of graphite.

As illustrated in FIG. 1, $I_D$ may be a peak value located at a wavelength near 1350 $cm^{-1}$, $I_G$ may be a peak value located at a wavelength near 1580 $cm^{-1}$, and the $I_D/I_G$ ratio may be an intensity ratio of the peaks.

The $I_D/I_G$ ratio may be in a range of 0.05 to 0.3, particularly 0.1 to 0.25, and more particularly 0.13 to 0.23.

In a case in which the $I_D/I_G$ ratio is less than 0.05, since the graphite is a high-quality carbon material in which amounts of defects or impurities are very small, it is not suitable for a negative electrode active material of a lithium secondary battery. In a case in which the graphite has an $I_D/I_G$ ratio of greater than 0.3, since an amount of defective structure is excessively large or crystallinity is low, a side reaction with a typical electrolyte solution including propylene carbonate does not occur or very little side reaction occurs.

The graphite may be a carbon material having a graphite structure, and may specifically be crystalline carbon. The crystalline carbon may include natural graphite, high-temperature graphitized natural graphite, Kish graphite, pyrolytic carbon, mesophase pitch-based carbon fibers, mesocarbon microbeads, mesophase pitches, and high-temperature sintered carbon such as petroleum or coal tar pitch derived cokes.

The negative electrode active material for a lithium secondary battery may be used alone or may be used by mixing with other negative electrode active materials. As the other negative electrode active materials in addition to the negative electrode active material for a lithium secondary battery, a typically used carbon material, such as amorphous carbon or a carbon composite capable of intercalating and deintercalating lithium ions, lithium metal, silicon, or tin may be used.

The negative electrode active material for a lithium secondary battery may be used in a lithium secondary battery, and thus, the present invention provides a lithium secondary battery including the negative electrode active material for a lithium secondary battery.

The lithium secondary battery may comprise a positive electrode, a negative electrode, and a separator disposed between the positive electrode and the negative electrode.

The positive electrode may be prepared by a typical method known in the art. For example, a binder, a conductive agent, and a dispersant, if necessary, as well as a solvent are mixed with a positive electrode active material and stirred to prepare a slurry, a metal current collector is then coated with the slurry and pressed, and the positive electrode may then be prepared by drying the coated metal current collector.

The metal current collector is a metal with high conductivity, wherein the metal current collector is not particularly limited so long as it, as a metal to which the slurry of the positive electrode active material may be easily adhered, has high conductivity without causing adverse chemical changes in the battery in a voltage range of the battery, and, for example, stainless steel, aluminum, nickel, titanium, fired carbon, or aluminum or stainless steel that is surface-treated with one of carbon, nickel, titanium, silver, or the like may be used. Also, the metal current collector may have a microscopic uneven surface to improve the adhesion of the positive electrode active material. The current collector may be used in various shapes, such as a film, a sheet, a foil, a net, a porous body, a foam body, a non-woven fabric body, and the like, and may have a thickness of 3 μm to 500 μm.

Examples of the positive electrode active material may be lithium cobalt oxide ($LiCoO_2$), lithium nickel oxide ($LiNiO_2$), $Li[Ni_aCo_bMn_cM^1_d]O_2$ (where $M^1$ is at least one element selected from the group consisting of aluminum (Al), gallium (Ga), and indium (In), $0.3 \le a < 0.1$, $0 \le b \le 0.5$, $0 \le c \le 0.5$, $0 \le d \le 0.1$, and $a+b+c+d=1$); a layered compound, such as $Li(Li_eM^2_{f-e-f'}M^3_{f'})O_{2-g}A_g$ (where $0 \le e \le 0.2$, $0.6 \le f \le 1$, $0 \le f' \le 0.2$, $0 \le g \le 0.2$, $M^2$ includes manganese (Mn) and at least one selected from the group consisting of nickel (Ni), cobalt (Co), iron (Fe), chromium (Cr), vanadium (V), copper (Cu), zinc (Zn), and titanium (Ti), $M^3$ is at least one selected from the group consisting of Al, magnesium (Mg), and boron (B), and A is at least one selected from the group consisting of phosphorous (P), fluorine (F), sulfur (S), and nitrogen (N)), or a compound substituted with at least one transition metal; lithium manganese oxides such as $Li_{1+h}Mn_{2-h}Mn_{2-h}O_4$ (where $0 \le h \le 0.33$), $LiMnO_3$, $LiMn_2O_3$, and $LiMnO_2$; lithium copper oxide ($Li_2CuO_2$); vanadium oxides such as $LiV_3O_8$, $V_2O_5$, and $Cu_2V_2O_7$; Ni-site type lithium nickel oxide represented by the chemical formula $LiNi_{1-i}M^4_iO_2$ (where $M^4$=Co, Mn, Al, Cu, Fe, Mg, B, or Ga, and $0.01 \le i \le 0.3$); lithium manganese complex oxide represented by the chemical formula $LiMn_{2-j}M^5_jO_2$ (where $M^5$=Co, Ni, Fe, Cr, Zn, or tantalum (Ta), and $0.01 \le j \le 0.1$) or $Li_2Mn_3M^6O_8$ (where $M^6$=Fe, Co, Ni, Cu, or Zn); $LiMn_2O_4$ having a part of lithium (Li) being substituted with alkaline earth metal ions; a disulfide compound; $LiFe_3O_4$, or $Fe_2(MoO_4)_3$, but the positive electrode active material is not limited thereto.

An organic solvent, such as N-methylpyrrolidone (NMP), dimethylformamide (DMF), acetone, and dimethylacetamide, or water may be used as the solvent used for forming the positive electrode. These solvents may be used alone or in a mixture of two or more thereof. An amount of the solvent used may be sufficient if the solvent may dissolve and disperse the positive electrode active material, the binder, and the conductive agent in consideration of a coating thickness of the slurry and manufacturing yield.

Various types of binder polymers, such as a polyvinylidene fluoride-hexafluoropropylene copolymer (PVDF-co-HEP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber (SBR), a fluorine rubber, poly acrylic acid, and a polymer having hydrogen thereof substituted with Li, sodium (Na), or calcium (Ca), or various copolymers, may be used as the binder.

Any conductive agent may be used without particular limitation so long as it has conductivity without causing adverse chemical changes in the battery, and, for example, a conductive material such as: graphite such as natural graphite or artificial graphite; a carbon black such as acetylene black, Ketjen black, channel black, furnace black, lamp black, and thermal black; conductive fibers such as carbon fibers and metal fibers; conductive tubes such as carbon nanotubes; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives may be used. The conductive agent may be used in an amount of 1 wt % to 20 wt % based on a total weight of the positive electrode slurry.

An aqueous dispersant or an organic dispersant, such as N-methyl-2-pyrrolidone, may be used as the dispersant.

The negative electrode may be prepared by a typical method known in the art, and, for example, the negative electrode active material and additives, such as a binder and a conductive agent, are mixed and stirred to prepare a negative electrode active material slurry, and a current collector may then be coated with the slurry, dried, and pressed to prepare the negative electrode.

An organic solvent, such as N-methylpyrrolidone (NMP), dimethylformamide (DMF), acetone, and dimethylacetamide, or water may be used as the solvent used for forming the negative electrode. These solvents may be used alone or in a mixture of two or more thereof. An amount of the solvent used may be sufficient if the solvent may dissolve and disperse the negative electrode active material, the binder, and the conductive agent in consideration of a coating thickness of the slurry and manufacturing yield.

The binder may be used for maintaining a molded article by binding negative electrode active material particles, wherein the binder is not particularly limited as long as it is a typical binder used in the preparation of the slurry for a negative electrode active material, but, for example, a non-aqueous binder, such as polyvinyl alcohol, carboxymethyl cellulose, hydroxypropylene cellulose, diacetylene cellulose, polyvinyl chloride, polyvinylpyrrolidone, polytetrafluoroethylene (PTFE), polyvinylidene fluoride (PVdF), polyethylene, or polypropylene, may be used, and at least one selected from the group consisting of an acrylonitrile-butadiene rubber, a styrene-butadiene rubber, and an acrylic rubber, which are aqueous binders, or a mixture of two or more thereof may be used. Since the aqueous binder, different from the non-aqueous binder, may be economical and environmentally friendly, may not be harmful to the health of workers, and may have a better binding effect than the non-aqueous binder, a ratio of the active material for the same volume may be increased. Thus, capacity of the lithium secondary battery may be increased, and the styrene-butadiene rubber may be preferably used as the aqueous binder.

The binder may be included in an amount of 10 wt % or less, for example, 0.1 wt % to 10 wt %, based on a total weight of the slurry for a negative electrode active material. When the amount of the binder is less than 0.1 wt %, it is not desirable because an effect obtained by using the binder is insignificant, and, when the amount of the binder is greater than 10 wt %, it is not desirable because capacity per volume may be reduced due to a relative decrease in the amount of the active material caused by the increase in the amount of the binder.

Any conductive agent may be used without particular limitation so long as it has conductivity without causing adverse chemical changes in the battery, and, examples of the conductive agent may be a conductive material such as: graphite such as natural graphite or artificial graphite; a carbon black such as acetylene black, Ketjen black, channel black, furnace black, lamp black, and thermal black; conductive fibers such as carbon fibers and metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives. The conductive agent may be used in an amount of 1 wt % to 9 wt % based on the total weight of the slurry for a negative electrode active material.

A negative electrode collector used in the negative electrode according to an embodiment of the present invention may have a thickness of 3 μm to 500 μm. The negative electrode collector is not particularly limited as long as it has conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, microscopic irregularities may be formed on the surface of the collector to improve the adhesion of the negative electrode active material, and the negative electrode collector may be used in various shapes such as a film, a sheet, a foil, a net, a porous body, a foam body, a non-woven fabric body, and the like.

Furthermore, a typical porous polymer film used as a typical separator, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator. Also, a typical porous nonwoven fabric, for example, a nonwoven fabric formed of high melting point glass fibers or polyethylene terephthalate fibers may be used, but the separator is not limited thereto.

A lithium salt, which may be included as an electrolyte used in the present invention, may be used without limitation so long as it is typically used in an electrolyte for a lithium secondary battery. For example, any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ may be used as an anion of the lithium salt.

In the electrolyte solution used in the present invention, any organic solvent typically used in an electrolyte solution for a secondary battery may be used without limitation as an organic solvent included in the electrolyte solution and, typically, any one selected from the group consisting of propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxyethane, diethoxyethane, vinylene carbonate, sulfolane, γ-butyrolactone, propylene sulfite, and tetrahydrofuran, or a mixture of two or more thereof may be used. Specifically, ethylene carbonate and propylene carbonate, cyclic carbonates among the carbonate-based organic solvents, well dissociate the lithium salt in the electrolyte due to high permittivities as high-viscosity organic solvents, and thus, the cyclic carbonate may be preferably used. Since an electrolyte having high electrical conductivity may be prepared when the cyclic carbonate is mixed with low viscosity, low permittivity linear carbonate, such as dimethyl carbonate and diethyl carbonate, in an appropriate ratio, the cyclic carbonate may be more preferably used. In particular, since the lithium secondary battery including the negative electrode active material for a lithium secondary battery of the present invention has excellent resistance to propylene carbonate by including the graphite having the alkali carbonate layer formed on the surface thereof, the lithium secondary battery may preferably include the propylene carbonate so as to exhibit excellent low-temperature performance.

Selectively, the electrolyte solution stored according to the present invention may further include an additive, such as an overcharge inhibitor, that is included in a typical electrolyte solution.

Figure 2:
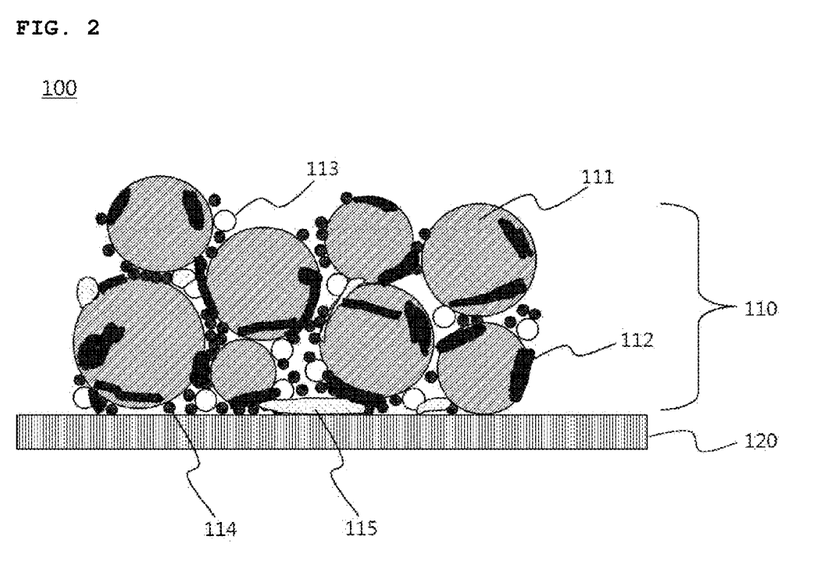
FIG. 2 schematically illustrates a negative electrode including a negative electrode active material for a lithium secondary battery according to an exemplary embodiment of the present invention.

FIG. 2 schematically illustrates a negative electrode including a negative electrode active material for a lithium secondary battery according to an exemplary embodiment of the present invention.

Referring to FIG. 2, in a negative electrode 100 including the negative electrode active material for a lithium secondary battery according to the exemplary embodiment of the present invention, a negative electrode active material layer 110 (only partially shown), which includes graphite 111 and an alkali carbonate layer 112 formed on a surface of the graphite 111 as well as a conductive agent 113 and binders 114 and 115 for binding them, is formed on a current collector 120. The alkali carbonate layer 112 is formed on a portion of the surface of the graphite 111, and contributes to the formation of a stable solid electrolyte interface (SEI, not shown) on the surface of the negative electrode 100 by a reaction with the electrolyte solution.

A shape of the lithium secondary battery of the present invention is not particularly limited, but a cylindrical type using a can, a prismatic type, a pouch type, or a coin type may be used.

The lithium secondary battery according to the present invention may not only be used in a battery cell that is used as a power source of a small device, but may also be used as a unit cell in a medium and large sized battery module including a plurality of battery cells.

Preferred examples of the medium and large sized device may be an electric vehicle, a hybrid electric vehicle, a plug-in hybrid electric vehicle, or a power storage system, but the medium and large sized device is not limited thereto.

Also, the present invention provides a method of preparing the negative electrode active material for a lithium secondary battery.

The negative electrode active material for a lithium secondary battery may be prepared by the method including: (1) preparing graphite having an $I_D/I_G$ ratio of 0.05 to 0.3 in Raman spectroscopy; (2) mixing and stirring the graphite and an aqueous solution of alkali carbonate; (3) filtering out the stirred mixture under reduced pressure; and (4) drying a product obtained by the filtration in a vacuum oven at a temperature of 60° C. to 200° C.

$I_D$ may be a peak value located at a wavelength near 1350 cm$^{-1}$, $I_G$ may be a peak value located at a wavelength near 1580 cm$^{-1}$, and the $I_D/I_G$ ratio may be an intensity ratio of the peaks.

The $I_D/I_G$ ratio may be in a range of 0.05 to 0.3, particularly 0.1 to 0.25, and more particularly 0.13 to 0.23.

In a case in which the $I_D/I_G$ ratio is less than 0.05, since the graphite is a high-quality carbon material in which amounts of defects or impurities are very small, it is not suitable for a negative electrode active material of a lithium secondary battery. In a case in which the graphite has an $I_D/I_G$ ratio of greater than 0.3, since an amount of defective structure is excessively large or crystallinity is low, a side reaction with a typical electrolyte including propylene carbonate does not occur or very little side reaction occurs.

The graphite may be a carbon material having a graphite structure, and may specifically be crystalline carbon. The crystalline carbon may include natural graphite, high-temperature graphitized natural graphite, Kish graphite, pyrolytic carbon, mesophase pitch-based carbon fibers, mesocarbon microbeads, mesophase pitches, and high-temperature sintered carbon such as petroleum or coal tar pitch derived cokes.

An alkali carbonate layer may be formed on the surface of the graphite by mixing and stirring the graphite and the aqueous solution of alkali carbonate.

A stirring speed may be in a range of 100 rpm to 1,200 rpm, particularly 100 rpm to 800 rpm, and more particularly 200 rpm to 500 rpm. In a case in which the stirring speed is 100 rpm or more, since alkali carbonate is boned to the surface of the graphite, the alkali carbonate layer may be smoothly formed on the surface of the graphite. In a case in which the stirring speed is 1,200 rpm or less, limitations, such as deformation of crystal structure or exfoliation of the graphite occurred from damage caused by an external force due to the excessive stirring speed, may be prevented while the alkali carbonate layer may be smoothly formed on the surface of the graphite.

The stirring may be performed for 30 minutes to 12 hours, particularly 30 minutes to 6 hours, and more particularly 1 hour to 3 hours.

In a case in which the stirring time is too short, the formation of the alkali carbonate layer on the surface of the graphite may be insufficient, and, in a case in which the stirring time is too long, a limitation due to the evaporation of the alkali carbonate aqueous solution in the process may occur. Thus, the stirring may be performed within the above time range.

The stirring may be performed in a temperature range of 20° C. to 60° C., particularly 25° C. to 45° C., and more particularly 25° C. to 35° C.

In a case in which the stirring temperature is less than 20° C., since a reaction rate between the alkali carbonate and the surface of the graphite is decreased, it is difficult to smoothly perform the coating, and, in a case in which the stirring temperature is greater than 60° C., the alkali carbonate aqueous solution may be evaporated or may change into a vapor state before the graphite is sufficiently wetted with the alkali carbonate aqueous solution.

The alkali carbonate may be at least one selected from the group consisting of sodium carbonate ($Na_2CO_3$), lithium carbonate ($Li_2CO_3$), and potassium carbonate ($K_2CO_3$).

The alkali carbonate aqueous solution may have a concentration of 1% (w/v) to 10% (w/v), particularly 1% (w/v) to 7% (w/v), and more particularly 2% (w/v) to 5% (w/v).

In a case in which the concentration of the alkali carbonate aqueous solution is 1% (w/v) or more, since the alkali carbonate is smoothly bonded to the surface of the graphite, a limitation, such as an excessive increase in the stirring time, may be prevented, and, in a case in which the concentration of the alkali carbonate aqueous solution is 10% (w/v) or less, a decrease in conductivity between the graphite particles due to the excessive formation of the alkali carbonate layer may be prevented.

The stirred mixture is filtered to collect a product, that is, a negative electrode active material for a lithium secondary battery in which the alkali carbonate forms a layer on the surface of the graphite. In this case, the filtering may be performed under reduced pressure. After the filtering, a process of further washing the obtained negative electrode active material for a lithium secondary battery, in which the alkali carbonate forms the layer on the surface of the graphite, with distilled water is not performed.

Next, a negative electrode active material for a lithium secondary battery may be prepared by drying the collected product obtained by the filtration in a vacuum oven at a temperature of 60° C. to 200° C. Drying time is not particularly limited, but the drying may be performed for 3 hours or more, for example, 6 hours to 24 hours.

EXAMPLES

Hereinafter, the present invention will be described in detail, according to examples and experimental examples. However, the present invention is not limited to these examples and experimental examples. The invention may be embodied in many different forms and should not be construed as being limited to the embodiments set forth herein. Rather, these example embodiments are provided so that this description will be thorough and complete, and will fully convey the scope of the present invention to those skilled in the art.

Example 1: Preparation of Negative Electrode Active

Material for Lithium Secondary Battery

After 5 g of graphite ($I_D/I_G$ ratio=0.134, $d_{50}$=19 μm, Brunauer-Emmett-Teller (BET)=2 m$^2$/g, tap density=0.95 g/cc) was mixed with 100 mk of a 1% (w/v) Li CO$_3$ aqueous solution and stirred for 30 minutes at 30° C., the stirred mixture was filtered under reduced pressure.

A product obtained by the filtration was dried in a vacuum oven at a temperature of 100° C. for 24 hours to prepare graphite having an alkali carbonate layer formed on the surface thereof.

Example 2: Preparation of Negative Electrode Active

Material for Lithium Secondary Battery

Graphite having an alkali carbonate layer formed on the surface thereof was prepared in the same manner as in Example 1 except that graphite ($I_D/I_G$ ratio=0.226, $d_{50}$=22 μm, BET=3.8 m$^2$/g, tap density=1.05 g/cc) was used instead of the graphite of Example 1.

Example 3: Preparation of Negative Electrode and Lithium Secondary Battery

<Preparation of Negative Electrode>

The graphite having an alkali carbonate layer formed on the surface thereof, which was prepared in Example 1, as a negative electrode active material, super C65 (Timcal) as a conductive agent, and polyvinylidene fluoride (PVdF), as a binder, were mixed in a weight ratio of 94:1:5 in N-methylpyrrolidone (NMP), as a solvent, to prepare a uniform negative electrode active material slurry.

After one surface of a copper current collector was coated with the prepared negative electrode active material slurry to a thickness of 65 μm, dried, and rolled, the coated copper current collector was punched into a predetermined size to prepare a negative electrode.

<Preparation of Lithium Secondary Battery>

A Li metal was used as a counter electrode, a polyolefin separator was disposed between the negative electrode and the Li metal, and a coin-type half cell was then prepared by injecting an electrolyte solution in which 1 M LiPF$_6$ was dissolved in a solvent that was prepared by mixing ethylene carbonate (EC), propylene carbonate (PC), and ethyl methyl carbonate (EMC) in a volume ratio of 20:10:70.

Example 4: Preparation of Negative Electrode and Lithium Secondary Battery

A coin-type half cell was prepared in the same manner as in Example 3 except that the graphite having an alkali carbonate layer formed on the surface thereof, which was prepared in Example 2, was used as a negative electrode active material in Example 3, instead of the graphite having an alkali carbonate layer formed on the surface thereof which was prepared in Example 1.

Comparative Example 1

A coin-type half cell was prepared in the same manner as in Example 3 except that graphite ($I_D/I_G$ ratio=0.134, $d_{50}$=19 μm, BET=2 m$^2$/g, tap density=0.95 g/cc), in which a separate layer was not formed on the surface thereof, was used as a negative electrode active material, instead of the graphite having an alkali carbonate layer formed on the surface thereof which was prepared in Example 1.

Comparative Example 2

A coin-type half cell was prepared in the same manner as in Comparative Example 1 except that an electrolyte solution, in which 1 M LiPF$_6$ was dissolved in a solvent that was prepared by mixing ethylene carbonate (EC) and ethyl methyl carbonate (EMC) in a volume ratio of 30:70, was used as the electrolyte solution.

Comparative Example 3

A coin-type half cell was prepared in the same manner as in Example 3 except that graphite ($I_D/I_G$ ratio=0.404, $d_{50}$=17 μm, BET=2.7 m$^2$/g, tap density=1.01 g/cc), in which a separate layer was not formed on the surface thereof, was used as a negative electrode active material, instead of the graphite having an alkali carbonate layer formed on the surface thereof which was prepared in Example 1.

Comparative Example 4

A coin-type half cell was prepared in the same manner as in Comparative Example 3 except that an electrolyte solution, in which 1 M LiPF$_6$ was dissolved in a solvent that was prepared by mixing ethylene carbonate (EC) and ethyl methyl carbonate (EMC) in a volume ratio of 30:70, was used as the electrolyte solution.

Experimental Example 1: Scanning Electron Microscope (SEM)

Figure 3:
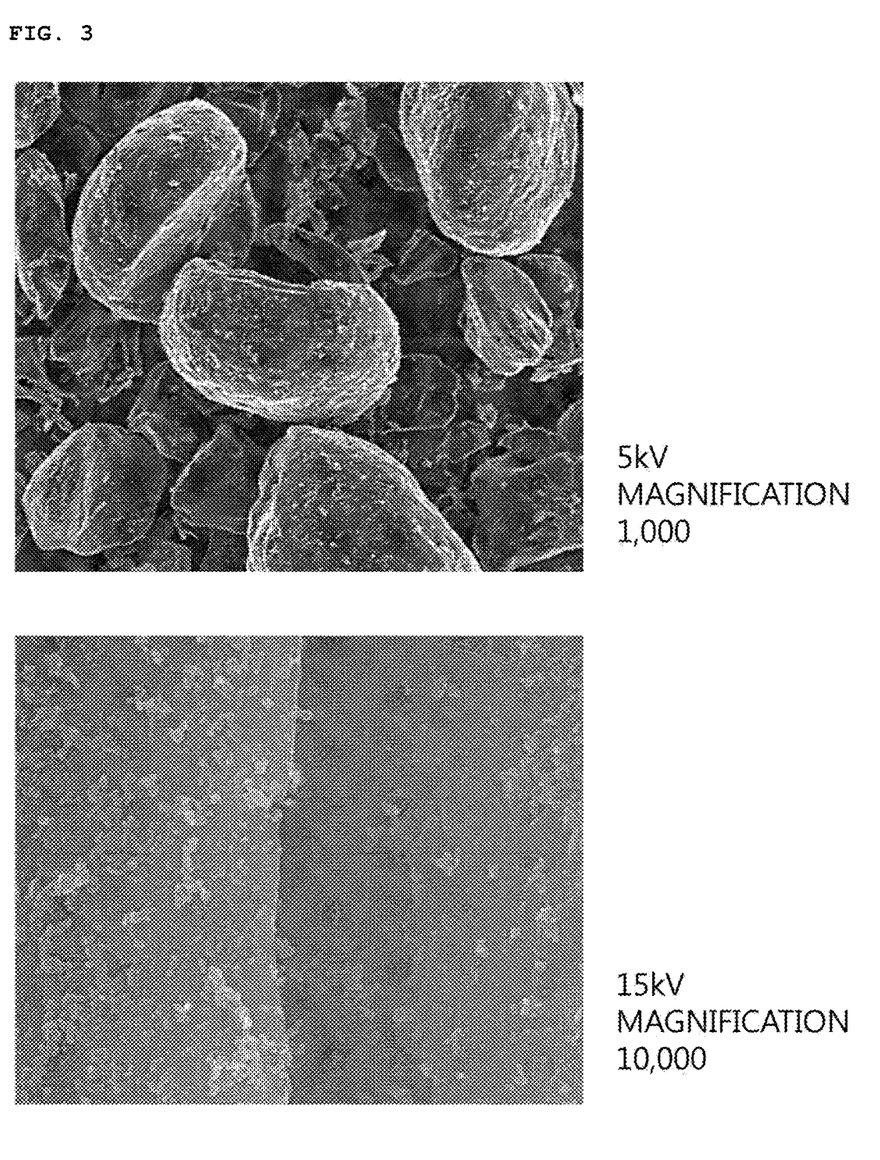
FIG. 3 illustrates scanning electron microscope (SEM) images with different magnifications of graphite having an alkali carbonate layer formed on the surface thereof which is prepared in Example 2.

Images of the graphite having an alkali carbonate layer formed on the surface thereof, which was prepared in Example 2, were taken using a scanning electron microscope (SEM) with different magnifications, and the results thereof are presented in FIG. 3.

Referring to FIG. 3, the alkali carbonate layer was partially formed while a smooth portion of the surface of the graphite and portions that looked like small particles were coexisted, and it may be confirmed that the alkali carbonate did not entirely cover the surface of the graphite.

Experimental Example 2: Initial Efficiency Evaluation

Each of the batteries prepared in Examples 3 and 4 and Comparative Examples 1 to 4 were charged at a constant current (CC) of 0.1 C to a voltage of 0.005 V at 25° C., and thereafter, charge in the first cycle was performed by charging the lithium secondary batteries at a constant voltage (CV) to a current of 0.005 C (cut-off current). After the batteries were left standing for 20 minutes, the batteries were discharged at a constant current (CC) of 0.1 C to a voltage of 1.0 V. Efficiency in this case was measured and the results thereof are presented in Table 1 below.

Experimental Example 3: Low-temperature Performance Evaluation

Each of the batteries prepared in Examples 3 and 4 and Comparative Examples 1 to 4, which were subjected to the initial efficiency evaluation in Experimental Example 1, were charged at a constant current (CC) of 0.5 C to a voltage of 0.005 V at 25° C., and thereafter, charge in the first cycle was performed by charging the lithium secondary batteries at a constant voltage (CV) to a current of 0.005 C (cut-off current). After the batteries were left standing for 20 minutes, capacity at 0.5 C and 25° C. was checked by discharging the batteries at a constant current (CC) of 0.5 C to a voltage of 1.0 V. Then, the batteries were put in a chamber at −20° C., capacity at 0.5 C was checked through the same process, and room-temperature versus low-temperature capacity retention rates were compared. The values thus obtained are also presented in Table 1 below.

Experimental Example 4: High-Temperature Life Characteristics Evaluation

Li(Ni$_{0.6}$Co$_{0.2}$Mn$_{0.2}$)O$_2$ as a positive electrode active material, Super C as a conductive agent, and PVDF, as a binder, were added to N-methylpyrrolidone (NMP), as a solvent, at a weight ratio of 92:4:4 to prepare a positive electrode mixture slurry. An about 20 μm thick aluminum (Al) thin film, as a positive electrode collector, was coated with the positive electrode mixture slurry and dried, and the coated Al thin film was then roll-pressed to prepare a positive electrode.

Monocells in the form of positive electrode/separator/negative electrode were prepared by using the prepared positive electrode and the negative electrodes prepared in Examples 3 and 4 and Comparative Examples 1 and 3 with a separator composed of three layers of polypropylene/polyethylene/polypropylene (PP/PE/PP), and lithium secondary batteries were then prepared by injecting an electrolyte solution in which 1 M LiPF$_6$ was dissolved in a solvent that was prepared by mixing ethylene carbonate (EC), propylene carbonate (PC), and ethyl methyl carbonate (EMC) in a volume ratio of 20:10:70.

Figure 4:
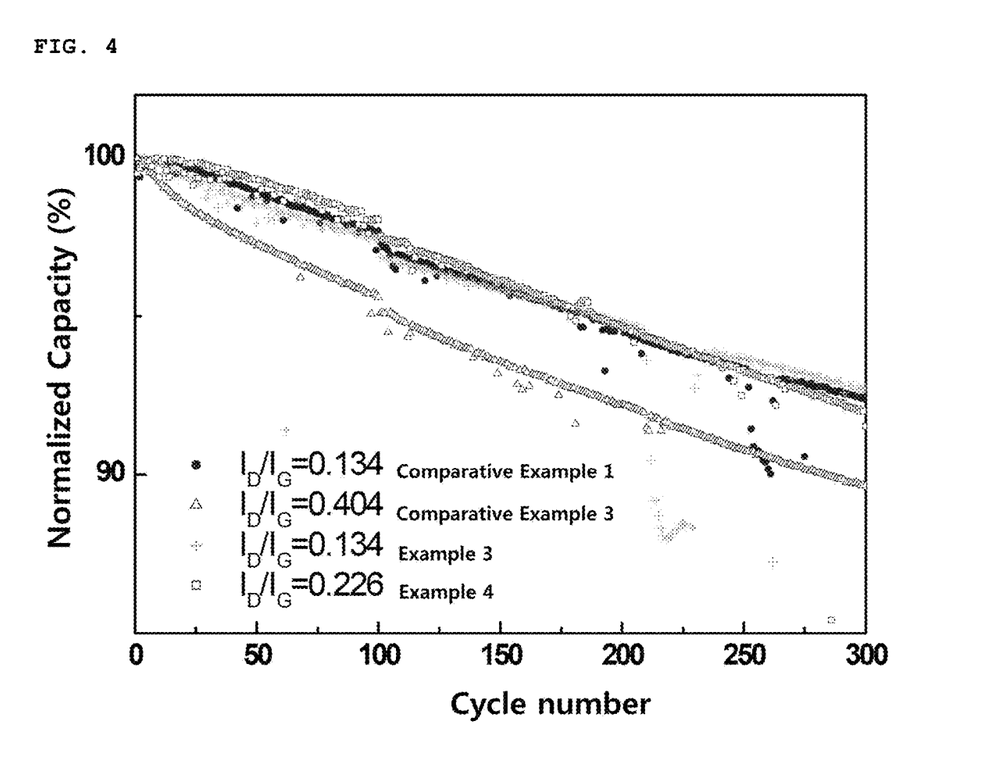
FIG. 4 is a graph illustrating the results of high-temperature lifetime evaluation of lithium secondary batteries prepared by using negative electrodes which are prepared in Examples 3 and 4 and Comparative Examples 1 and 3.

The prepared batteries were charged at 1 C to 4.2 V/38 mA under a constant current/constant voltage (CC/CV) condition and then discharged at a constant current (CC) of 1 C to a voltage of 2.5 V to measure discharge capacities. This charge and discharge cycle was repeated 1 to 300 times, and the results thereof are presented in FIG. 4 below. In FIG. 4, the y-axis represents normalized capacity, and the x-axis represents cycle number.

TABLE 1

|  | Initial efficiency (%) | Low-temperature capacity/room-temperature capacity (%) |
| --- | --- | --- |
| Example 3 | 92 | 63.5 |
| Example 4 | 93.3 | — |
| Comparative Example 1 | 66.7 | Impossible to charge/discharge |
| Comparative Example 2 | 92.2 | 60.6 |
| Comparative Example 3 | 92.5 | 63.1 |
| Comparative Example 4 | 92.4 | 57.9 |

As shown in Table 1, since the negative electrode active materials, in which the alkali carbonate layer was formed on the surface thereof, were used in the lithium secondary batteries according to Examples 3 and 4 of the present invention, it may be confirmed that significantly better initial efficiencies were obtained in comparison to that of the lithium secondary battery of Comparative Example 1, in which graphite itself was used as the negative electrode active material, even in a case in which the electrolyte solution including propylene carbonate was used. Also, in the low-temperature performance evaluation test, since exfoliation of the graphite occurred in the battery of Comparative Example 1 due to the influence of the electrolyte including propylene carbonate, charging/discharging of the battery was not properly performed, and thus, the evaluation of the battery did not proceed.

In this regard, referring to the results of Comparative Example 2, the same material as that of Comparative Example 1 was used as the negative electrode active material in the lithium secondary battery of Comparative Example 2, but, since propylene carbonate was not included in the electrolyte solution, it may be confirmed that initial efficiency of the lithium secondary battery of Comparative Example 2 was at an equivalent level to those of Examples 3 and 4 of the present invention. However, with respect to the lithium secondary battery of Comparative Example 2, since the propylene carbonate was not included in the electrolyte solution, it may be confirmed that low-temperature performance was relatively degraded.

With respect to the lithium secondary batteries of Comparative Examples 3 and 4, less side reaction between the propylene carbonate and the graphite occurred by using the graphite having low crystallinity, and thus, there was no significant difference from the lithium secondary batteries of Examples 3 and 4 of the present invention in terms of the initial efficiency, but it may be confirmed that the lithium secondary batteries of Comparative Examples 3 and 4 were inferior in high-temperature life characteristics in comparison to the lithium secondary batteries of Examples 3 and 4 of the present invention as confirmed in FIG. 4.

Thus, it may be confirmed that excellent high-temperature performance was achieved when the graphite having high crystallinity was used, and, in a case in which propylene carbonate was included in the electrolyte solution, the initial efficiency of the lithium secondary battery was reduced due to the side reaction between the propylene carbonate and the graphite when the graphite itself was used as the negative electrode active material without a separate process. Also, it may be confirmed that, in a case in which the alkali carbonate layer was formed on the graphite, a more stable and robust solid electrolyte interface (SEI) was formed to suppress the side reaction between the propylene carbonate and the graphite, and thus, the initial efficiency may be increased.

The invention claimed is:

1. A negative electrode active material for a lithium secondary battery, which comprises graphite having an alkali carbonate layer formed on a surface thereof,
    wherein the graphite has an $I_D/I_G$ ratio of 0.05 to 0.3 in Raman spectroscopy, and
    wherein the alkali carbonate layer is formed on an area corresponding to 10% to 50% of a total surface area of the graphite.

2. The negative electrode active material for a lithium secondary battery of claim 1, wherein the alkali carbonate comprises at least one selected from the group consisting of sodium carbonate (Na$_2$CO$_3$), lithium carbonate (Li$_2$CO$_3$), and potassium carbonate (K$_2$CO$_3$).

3. The negative electrode active material for a lithium secondary battery of claim 1, wherein the alkali carbonate layer has a thickness of 1 nm to 150 nm.

4. The negative electrode active material for a lithium secondary battery of claim 1, wherein the graphite has a particle diameter of 6 μm to 30 μm.

5. The negative electrode active material for a lithium secondary battery of claim 1, wherein the $I_D$ is a peak value located at a wavelength near 1350 cm$^{-1}$, the $I_G$ is a peak value located at a wavelength near 1580 cm$^{-1}$, and the $I_D/I_G$ ratio is an intensity ratio of the peaks.

6. The negative electrode active material for a lithium secondary battery of claim 1, wherein the $I_D/I_G$ ratio is in a range of 0.1 to 0.25.

7. A lithium secondary battery comprising the negative electrode active material for a lithium secondary battery of claim 1.

8. A method of preparing theft negative electrode active material for a lithium secondary battery of claim 1, the method comprising:
(1) preparing the graphite having an $I_D/I_G$ ratio of 0.05 to 0.3 in Raman spectroscopy;
(2) mixing and stirring the graphite and an aqueous solution of alkali carbonate;
(3) filtering out the stirred mixture under reduced pressure; and
(4) drying a product obtained by the filtration in a vacuum oven at a temperature of 60° C. to 200° C.

9. The method of claim 8, wherein the $I_D$ is a peak value located at a wavelength near 1350 cm$^{-1}$, the $I_G$ is a peak value located at a wavelength near 1580 cm$^{-1}$, and the $I_D/I_G$ ratio is an intensity ratio of the peaks.

10. The method of claim 8, wherein the $I_D/I_G$ ratio is in a range of 0.1 to 0.25.

11. The method of claim 8, wherein a stirring speed is in a range of 100 rpm to 1,200 rpm.

12. The method of claim 8, wherein the alkali carbonate comprises at least one selected from the group consisting of sodium carbonate ($Na_2CO_3$), lithium carbonate ($Li_2CO_3$), and potassium carbonate ($K_2CO_3$).

13. The method of claim 8, wherein the alkali carbonate aqueous solution has a concentration of 1% (w/v) to 10% (w/v).

* * * * *